United States Patent [19]

Preston et al.

[11] 4,235,975

[45] Nov. 25, 1980

[54] BIS(DIMETHYLBENZYL)DIPHENYLAMINE SCORCH INHIBITOR FOR POLYURETHANE FOAMS CONTAINING HALOGENATED PHOSPHATE ESTERS

[75] Inventors: Frank J. Preston, Madison; Steven T. Nakos, West Hartford; Louis Rua, Jr., Woodbridge, all of Conn.

[73] Assignee: Olin Corporation, New Haven, Conn.

[21] Appl. No.: 61,563

[22] Filed: Jul. 27, 1979

[51] Int. Cl.³ ............................................. C08G 18/14
[52] U.S. Cl. .................................. 521/107; 521/128; 521/163
[58] Field of Search ........................ 521/107, 128, 163

[56] References Cited

U.S. PATENT DOCUMENTS

| 3,406,222 | 10/1968 | Moncure | 260/45.7 R |
| 3,567,664 | 3/1971 | Haring | 521/128 |
| 3,707,586 | 12/1972 | Turley | 521/107 |
| 3,817,881 | 6/1974 | Turley | 521/127 |
| 3,947,389 | 3/1976 | Ito et al. | 521/128 |
| 4,045,378 | 8/1977 | Maxwell | 521/107 |

Primary Examiner—Maurice J. Welsh
Attorney, Agent, or Firm—F. A. Iskander; Thomas P. O'Day

[57] ABSTRACT

Polyurethane foam formulations containing halogenated phosphate ester additives are inhibited against scorching through the use of an effective amount of 4,4'-bis($\alpha$, $\alpha$-dimethylbenzyl)diphenylamine.

10 Claims, No Drawings

BIS(DIMETHYLBENZYL)DIPHENYLAMINE SCORCH INHIBITOR FOR POLYURETHANE FOAMS CONTAINING HALOGENATED PHOSPHATE ESTERS

Since commercial introduction of polyurethane foam products, foam manufacturers have been beset by a continuing scorch problem. This scorching is characterized as a discoloration appearing during the foaming and curing steps, and, depending on the degree of scorch severity, could cause structural damage and attendant weaknesses in the body of the foam. Studies have failed to reveal the exact nature of the mechanism of scorch; however, it has been noted that acids and oxygen intensify the problem (see U.S. Pat. No. 3,214,397).

In recent years, the use of various flame retardant additives in polyurethane foam formulations has become widespread. For example, as taught in U.S. Pat. Nos. 3,707,586 and 3,817,881, issued to Olin Corporation, halogenated phosphate ester additives can be incorporated into polyurethane foam formulations to reduce the combustibility characteristics of the foam. However, the addition of flame retardants to foam formulations introduces its own peculiar scorch problems.

Now, according to the present invention, it has been discovered that in polyurethane foam formulations containing halogenated phosphate ester additives, the use of an effective amount of a select diphenylamine derivative, alone or in further combination with hydroquinone, serves to inhibit scorching in the resulting foam.

As employed herein in both the specification and claims attendant thereto, the term "inhibiting scorching" is defined as minimizing the visible discoloration caused by scorching on and in a polyurethane foam product so that a substantially uniform colored product is obtained.

For the present invention, halogenated phosphate esters can be employed which are represented by the formula

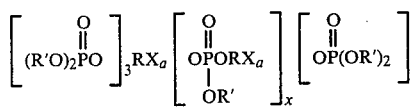
(I)

wherein R is an aliphatic hydrocarbon radical having 1-8 carbon atoms, or an aromatic hydrocarbon radical having 6-14 carbon atoms, X is a halogen selected from chlorine, bromine and a mixture thereof, a is an integer of 0-4, x is an integer of 0-4, n is an integer of 0-6, and each R' is independently a haloalkyl radical having 1-8 carbon atoms, the halogen in this radical being chlorine, bromine or a mixture thereof.

Such esters and their preparation are described in U.S. Pat. Nos. 3,707,586 and 3,817,881, issued to Richard J. Turley on Dec. 26, 1972 and June 18, 1974, respectively.

Preferred esters for use according to the invention are those of Formula I above wherein R represents an aliphatic hydrocarbon radical having 1-8 carbon atoms, all the radicals represented by R' are identical and n is 2. Furthermore, it is generally more preferred to use those esters of Formula I wherein all the halogens are chlorine, X is chlorine, e.g., a=0 and all the radicals represented by R' are chloroalkyl.

Illustrative of the preferred esters are the following:
tetrakis(2-chloroethyl)ethylene diphosphate
tetrakis(2-chloroisopropyl)ethylene diphosphate
tetrakis(2-chloroethyl)p-phenylene diphosphate
tetrakis(2-chloroethyl)m-phenylene diphosphate
tetrakis(2-chloroethyl)tetrachloro-p-phenylene diphosphate
tetrakis(2-bromoethyl)ethylene diphosphate
tetrakis(2-chloroethyl)-2-butene-1,4-diphosphate
tetrakis(2-chloroethyl)-2,3-dibromobutylene-1,4-diphosphate
tetrakis(2-bromoisopropyl)ethylene diphosphate
2,2-bis(chloromethyl)-1,3-propylene-bis[bis(2-chloroethyl)phosphate]
2,2-bis(chloromethyl)-1,3-propylene-bis[bis(2-bromoethyl)phosphate]
2,2-bis(chloromethyl)-1,3-propylene-bis[bis(2-chloropropyl)phosphate]
2,2-bis(bromomethyl)-1,3-propylene-bis[bis(2-bromoethyl)phosphate]
2,2-bis(bromoethyl)-1,3-propylene-bis[bis(2-chloroethyl)phosphate]
tetrakis(2,3-dichloropropyl)ethylene diphosphate
tetrakis(2,3-dibromopropyl)ethylene diphosphate
tetrakis(2-bromoethyl)-2-butene-1,4-diphosphate
tris(chloroethyl)phosphate
tris(chloropropyl)phosphate
tris(2,3-dichloropropyl)phosphate
tris(2,3-dibromopropyl)phosphate.

A particularly preferred group of phosphate esters which are amenable to treatment by the method of the invention are those represented by Formula II as follows:

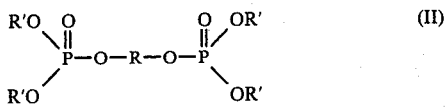
(II)

wherein R' is a chloroalkyl radical having 1-8, preferably 1-4, carbon atoms, and R is an alkylene radical having 1-8, and more preferably 1-4, carbon atoms.

Compounds which are illustrative of those represented by Formula II include tetrakis(2-chloroethyl)ethylene diphosphate, tetrakis(2-chloroisopropyl)ethylene diphosphate and tetrakis(2-chloroethyl)2-butene-1,4-diphosphate.

According to the invention, the esters of Formula I are utilized as additives in flexible, semi-rigid and rigid polyurethane foam compositions. In preparing the polyurethane foams of the invention, either the so-called "one-shot method" or the "prepolymer technique" may be employed. Any combination of polyols, including polyether polyols and polyester polyols, organic polyisocyanate, foaming agent, catalyst and other reactants capable of forming a flexible urethane foam can be employed, and the term "polyurethane foam formulation" in the specification and claims herein is intended to include the product of any such combination. Typical formulations are described in U.S. Pat. No. 3,072,582, issued Jan. 8, 1963 and Canadian Pat. No. 705,938, issued Mar. 16, 1965.

While, as indicated above, both polyether and polyester polyols can be employed in the practice of this invention, preferred embodiments utilize polyether polyols in the preparation of the polyurethane foam-forming reaction mixture. Any suitable polyether polyols may be used for this purpose. These polyether polyols usually have a hydroxyl number, for example, from about 25 to about 800.

The polyether polyols include, for example, oxyalkylated polyhydric alcohols having a molecular weight range of about 200–10,000 and preferably between about 250–8,000. These oxyalkylated polyhydric alcohols are generally prepared by methods well known in the art such as reacting, in the presence of an alkaline catalyst, a polyhydric alcohol and an alkylene oxide such as ethylene oxide, propylene oxide, butylene oxide, amylene oxide, epichlorohydrin and mixtures of these alkylene oxides, using either random or step-wise addition.

Polyhydric alcohols suitable for use in preparing the polyether polyols include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, dextrose, mixtures thereof and the like. If desired, a portion or all of the polyhydric alcohols may be replaced with another compound having at least two reactive hydrogen atoms, such as alkyl amines, alkylene polyamines, cyclic amines, amides and polycarboxylic acids. Suitable alkyl amines and alkylene polyamines include methylamine, ethylamine, propylamine, butylamine, hexylamine, ethylenediamine, 1,6-hexanediamine, diethylenetriamine and the like. Also, such cyclic amines as piperzine, 2-methylpiperazine and 2,5-dimethylpiperazine can also be used. Amides, such as acetamide, succinamide and benzenesulfonamide, constitute a further class of such reactive hydrogen compounds. A still further class of such reactive hydrogen compounds is the di- and polycarboxylic acids, such as adipic acid, succinic acid, glutaric acid, aconitic acid, diglycollic acid and the like. It will be recognized that the reactive hydrogen compound can be one containing different functional groups having reactive hydrogen atoms, such as citric acid, glycollic acid, ethanolamine and the like. Aromatic polyamines such as toluene diamine may also be employed. Mixtures of oxyalkylated polyhydric alcohols are also suitable for use in the process of this invention.

Although, as indicated above, the polyurethane foams of the invention can be flexible, semi-rigid, or rigid, the flexible foams are preferred. Therefore, in preparing the polyurethane foam in accordance with this preferred embodiment of the invention, an oxyalkylated polyhydric alcohol is used having a molecular weight of about 2,000–7,000, and more preferably about 2,500–6,000.

The organic polyisocyanate used in the preparation of the polyurethane foams include toluene diisocyanate, such as the 80:20 by weight mixture or the 65:35 by weight mixture of the 2,4- and 2,6-isomers, ethylene diisocyanate, propylene diisocyanate, methylene-bis-4-phenyl isocyanate, 3,3′-bitoluene-4,4′-diisocyanate, hexamethylene diisocyanate, naphthalene-1,5-diisocyanate, polyphenylene polymethylene isocyanate, mixtures thereof and the like. The preferred organic polyisocyanate is toluene diisocyanate. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.35 NCO groups per hydroxyl group, and preferably between about 0.9 and about 1.25 NCO groups per hydroxyl group. The ratio of NCO to OH groups times 100 is referred to as the "index".

The polyurethane foams are prepared in the presence of a foaming agent which may be any of those known to be useful for this purpose. Illustrative are water and organic foaming agents containing up to about 7 carbon atoms such as the halogenated hydrocarbons, lower molecular weight alkanes, alkenes, ethers and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethyl chloride. Other useful foaming agents include lower molecular weight alkanes, alkenes and ethers such as methane, ethane, ethylene, propane, propylene, pentane, hexane, heptane, ethyl ether, diisopropyl ether, mixtures thereof and the like. The amount of foaming agent employed may be varied within a wide range. Generally, however, the halogenated hydrocarbons are employed in an amount from about 1 to about 50, and preferably about 5–35, parts per 100 parts by weight of the polyol, and generally water, the use of which is preferred, is employed in an amount from about 1 to 6 parts by weight per 100 parts by weight of the polyol.

The polyurethane foams are prepared in the presence of a catalytic amount of a reaction catalyst. The catalyst employed may be any of the catalysts known to be useful for this purpose, such as tertiary amines and metallic salts, particularly stannous salts and mixtures thereof. Typical tertiary amines include, but are not limited to, the following: N-ethyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate and the like. Any catalytic proportion of catalyst or catalyst mixture may be employed such as between about 0.1 and about 3.0 percent, and preferably between about 0.5 and about 2.5 percent, by weight of the polyol.

It is preferred in the preparation of the polyurethane foams of the present invention to employ minor amounts of a conventional surfactant in order to further improve the cell structure of the polyurethane foam. Typical of such surfactants are the silicones and the siloxaneoxyalkylene block copolymers. U.S. Pat. No. 2,834,748 and T. H. Ferrigno, *Rigid Plastic Foams* (New York: Reinhold Publishing Corp., 1963) pages 38–42, disclose various surfactants which are useful for this purpose. Generally, up to 2 parts by weight of the surfactant are employed per 100 parts of the polyol.

In utilizing the esters of Formula I to prepare the polyurethane foam of the invention, they are usually added to the polyurethane foam-forming reaction mixture prior to foaming. Conveniently, they are first blended with the polyol component used in making the foam and the blend is then added to the other ingredients of the polyurethane foam-forming reaction mixture. The proportion of the ester which is used is not limited to any particular amount or range so long as its inclusion in the foam-forming reaction mixture imparts reduced combustibility characteristics to the foam without otherwise detrimentally affecting the other properties of the foam. For example, in practice, a proportion of the ester may be used which ranges from about 2 to about 30 parts per 100 parts by weight of total polyol employed in making the foam. However, higher as well as lower proportions may be used, if desired. A particularly preferred proportion range is about 5-20 parts per 100 parts by weight of polyol.

The present invention is particularly applicable to relatively high water/low density flexible foams because scorching problems are more likely to occur in these type of foams than any other. The term "high water" is usually defined in the art to mean that about 3.6–5.5 parts, preferably about 4.0–5.2 parts, by weight of $H_2O$ is employed per 100 parts by weight of polyol. And, "low density" is usually used to mean that the resultant foam has a density of about 0.7–1.6 pounds per cubic foot. It should be noted that in the production of these foams, the more water being used normally causes lower density because the water reacts with isocyanate to form $CO_2$ which escapes and leaves air pockets. With high water foams, scorching or discoloration is thought to occur because more heat is created in the exotherm than with lower water/higher density foams.

The diphenylamine derivative which is used according to the present invention is 4,4'-bis($\alpha,\alpha$-dimethylbenzyl)diphenylamine, represented by the formula:

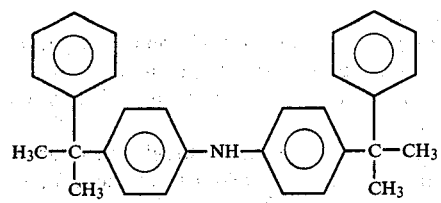

Generally, any amount of this diphenylamine derivative can be employed which is effective in inhibiting scorch in the polyurethane foam. Preferably, however, this additive is used in an amount ranging from about 0.1 to about 3.0 percent by weight based on the weight of the halogenated phosphate ester. A range from about 0.5 to about 2.0 percent is particularly preferred.

In accordance with the present invention, this diphenylamine derivative has been found to be particularly effective in further combination with hydroquinone. The use of hydroquinone alone as a scorch inhibitor in polyurethane foams containing halogenated phosphate ester additives already has been disclosed in commonly assigned U.S. Pat. No. 4,045,378. It has now been discovered that the combination of this select diphenylamine derivative with hydroquinone is more effective as a scorch inhibitor than the hydroquinone or the diphenylamine derivative alone. Generally, any amount of hydroquinone can be used with the diphenylamine derivative which is effective in inhibiting scorch. Preferably, though, when used with the diphenylamine derivative, the hydroquinone is added in an amount ranging from about 0.1 to about 5.0 percent based on the weight of the halogenated phosphate ester. An amount ranging from about 0.5 to about 2.0 percent is particularly preferred.

In practice, the diphenylamine derivative or hydroquinone/diphenylamine derivative combination can be added to and mixed with the halogenated phosphate ester before the addition of the phosphate ester to the polyurethane foam formulation, or the scorch inhibitor can be added separately to the reaction mixture.

The following examples are provided to illustrate the invention. In the examples, all parts and percentages are by weight, unless otherwise specified.

EXAMPLES I AND II

To demonstrate the effectiveness of the scorch inhibitor system according to the present invention, polyurethane foams were prepared from a standard formulation as outlined below. The foams were prepared using hand-mix techniques commonly employed in the art. In addition to a control run, wherein no scorch inhibitor additive was included, a series of runs was performed wherein varying amounts of 4,4'-bis($\alpha,\alpha$-dimethylbenzyl)diphenylamine, hydroquinone, and a mixture thereof were included in the reaction mixture. Table A below lists the inhibitors and amounts and reports the comparative results accomplished thereby.

For each of the examples, a foam hand-mix was prepared and poured into a $4'' \times 4'' \times 8''$ cardboard box. The freshly risen foam then was cured for two minutes in a 170° C. oven. After the two-minute cure, the foam was removed from the oven and the cardboard box was stripped away. The foam then was placed in an oven at 170° C. and heated for two hours. A standard convective oven was employed. Following the two-hour heating, the foam was removed from the oven, cut open and inspected for indications of scorch.

The examples reported in the table were ranked in order of scorch inhibiting effectiveness, with a ranking of 1 being the least scorched.

| Component | Formulation pbw |
|---|---|
| Polyol[1] | 100 |
| Isocyanate[2] | (120 Index) |
| Water | 5.0 |
| Surfactant[3] | 1.2 |
| Amine Catalyst[4] | 0.4 |
| Tin Catalyst[5] | 0.25 |
| Flame Retardant[6] | 10.0 |

[1]A polyether triol having a molecular weight of about 3000, prepared by random oxyalkylation of a glycerin initiator with a 5/95 mixture of ethylene oxide and propylene oxide. Contains 1200 ppm BHT.
[2]A mixture of toluene diisocyanate isomers (80:20 mixture of 2,4/2,6-isomers).
[3]A silicone surfactant commercially available under the trademark "DC-190" from Dow Corning.
[4]Commercially available under the trademark "Dabco 33 LV", consisting primarily of triethylene diamine (⅓) and dipropylene glycol (⅔).
[5]Stannous octoate catalyst commercially available under the trademark "Witco C-2".
[6]Tetrakis(2-chloroethyl)ethylene diphosphate.

TABLE A

| Example | Inhibitor | Rank | Coloration |
|---|---|---|---|
| I | 2.0% Hydroquinone 0.5% 4,4'-bis($\alpha,\alpha$-Dimethylbenzyl)-Diphenylamine | 1 | Substantially Uniform Light Beige |
| II | 1.5% 4,4'-bis($\alpha,\alpha$-Dimethylbenzyl)-Diphenylamine | 2 | ↓ DARKER ↓ |
| Comparative 1 | 0.5% Hydroquinone | 3 | ↓ |
| Comparative 2 | None | 4 | Brown |

EXAMPLES III AND IV

In each of these examples and comparisons, the same formulation and inhibitor levels were used as in Examples I and II and Comparative Examples 1 and 2 above. To more closely simulate actual production conditions, however, an alternate test method was employed. Here, a 12'×5'×3' foam slab was poured using a Martin-Sweets Model D machine. The slab then was cut into two six-foot lengths and the two halves were stacked in a 80° F./80% relative humidity room for 16 hours. After this treatment, a cross-sectional slice was taken from each run and inspected for indications of scorch. The results are reported in Table B, below. The foams are ranked from 1 to 4, with 1 being the least scorched.

In these examples, the polyol used included 2500 ppm BHT and 1200 ppm p,p'-dioctyldiphenylamine.

TABLE B

| Example | Inhibitor | Rank | Coloration |
|---|---|---|---|
| III | 2.0% Hydroquinone 0.5% 4,4'-bis(α,α-Dimethylbenzyl)-Diphenylamine | 1 | Substantially Uniform Light Beige ↓ |
| IV | 1.5% 4,4'-bis(α,α-Dimethylbenzyl)-Diphenylamine | 2 | ↓ DARKER ↓ |
| Comparative 3 | 0.5% Hydroquinone | 3 | ↓ |
| Comparative 4 | None | 4 | Brown |

What is claimed is:

1. In a process for preparing polyurethane foam from a reaction mixture comprising a polyether polyol, an organic polyisocyanate, a reaction catalyst, a foaming agent and a halogenated phosphate ester additive having the formula:

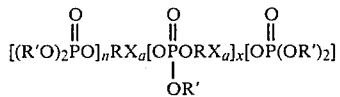

wherein R is an aliphatic hydrocarbon radical having 1-8 carbon atoms, or an aromatic hydrocarbon radical having 6-14 carbon atoms, X is a halogen selected from chlorine, bromine and a mixture thereof, a is an integer of 0-4, x is an integer of 0-4, n is an integer of 0-6, and each R' is independently a haloalkyl radical having 1-8 carbon atoms, the halogen in this radical being chlorine, bromine or a mixture thereof, the improvement which comprises including in said reaction mixture an effective amount of 4,4'-bis(α,α-dimethylbenzyl)diphenylamine to inhibit scorching in the resulting foam.

2. The process of claim 1 wherein an effective scorch-inhibiting amount of hydroquinone is also included in said reaction mixture.

3. The process of claim 1 wherein said 4,4'-bis(α,α-dimethylbenzyl)diphenylamine is added in an amount ranging from about 0.1 to about 3.0 percent by weight based on the halogenated phosphate ester.

4. The process of claim 3 wherein said 4,4'-bis(α,α-dimethylbenzyl)diphenylamine is added in an amount ranging from about 0.5 to about 2.0 percent by weight based on the halogenated phosphate ester.

5. The process of claim 2 wherein the hydroquinone is added in an amount ranging from about 0.1 to about 5.0 percent by weight based on the halogenated phosphate ester.

6. The process of claim 5 wherein the hydroquinone is added in an amount ranging from about 0.5 to about 2.0 percent by weight based on the halogenated phosphate ester.

7. The process of claim 3 wherein the hydroquinone is added in an amount ranging from about 0.1 to about 5.0 percent by weight based on the halogenated phosphate ester.

8. The process of claim 4 wherein the hydroquinone is added in an amount ranging from about 0.5 to about 2.0 percent by weight based on the halogenated phosphate ester.

9. The polyurethane foam product prepared according to the process of claim 1.

10. The polyurethane foam product prepared according to the process of claim 8.

* * * * *

UNITED STATES PATENT AND TRADEMARK OFFICE
CERTIFICATE OF CORRECTION

PATENT NO. : 4,235,975
DATED : November 25, 1980
INVENTOR(S) : Frank J. Preston, Steven T. Nakos and Louis Rua, Jr.

It is certified that error appears in the above-identified patent and that said Letters Patent are hereby corrected as shown below:

Column 1, lines 44-48, Formula I, reading

"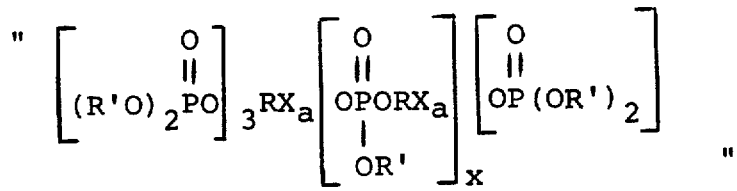"

should read

--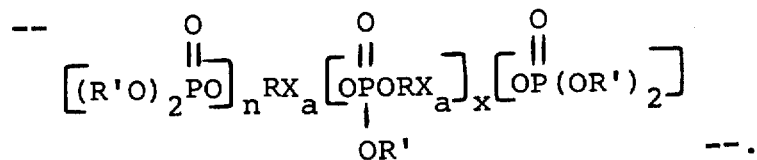--.

Signed and Sealed this

*Thirty-first* Day of *August 1982*

[SEAL]

*Attest:*

*Attesting Officer*

GERALD J. MOSSINGHOFF

*Commissioner of Patents and Trademarks*